United States Patent
Haubs et al.

(10) Patent No.: US 6,538,102 B1
(45) Date of Patent: Mar. 25, 2003

(54) METHOD FOR PRODUCING SULFUR-CONTAINING POLYMERS

(75) Inventors: Michael Haubs, Bad Kreuznach (DE); Reinhard Wagener, Flörsheim (DE); Markus Lehrl, Mörfelden-Walldorf (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/623,327
(22) PCT Filed: Mar. 5, 1999
(86) PCT No.: PCT/EP99/01445
§ 371 (c)(1), (2), (4) Date: Jan. 11, 2001
(87) PCT Pub. No.: WO99/45057
PCT Pub. Date: Sep. 10, 1999

(30) Foreign Application Priority Data

Mar. 5, 1998 (DE) .......................... 198 09 254
Jul. 10, 1998 (DE) .......................... 198 30 916

(51) Int. Cl.⁷ .......................... C08G 75/14; C08F 6/10; C08F 6/12
(52) U.S. Cl. .................. 528/561; 528/502 C; 528/373; 528/387; 528/397
(58) Field of Search .......................... 528/501, 502 C, 528/373, 387, 397

(56) References Cited

U.S. PATENT DOCUMENTS

| 4,056,515 A | 11/1977 | Vidaurri, Jr. |
| 5,055,551 A | 10/1991 | Schmidt et al. |
| 5,138,031 A | 8/1992 | Dorf et al. |
| 5,688,908 A | 11/1997 | Haubs et al. |
| 5,894,072 A | 4/1999 | Haubs et al. |

FOREIGN PATENT DOCUMENTS

| EP | 0353716 | 2/1990 |
| EP | 0373364 | 6/1990 |
| EP | 0374462 | 6/1990 |
| EP | 0405609 | 1/1991 |
| EP | 0737705 | 10/1996 |
| EP | 0798330 | 10/1997 |
| WO | 97/47676 | 12/1997 |

*Primary Examiner*—Duc Truong
(74) *Attorney, Agent, or Firm*—Connolly Bove Lodge & Hutz LLP

(57) ABSTRACT

The present invention relates to a process for preparing sulfur-containing polymers from at least one sulfide and from at least one aromatic dihalogen compound in at least one solvent, where a) a mixture made from a sulfide and from a solvent is prepared in a first reaction vessel, b) the sulfide and an aromatic dihalogen compound react in a second reaction vessel to form a sulfur-containing polymer, c) the pressure in the second reaction vessel is to some extent or completely released during the reaction, and the emanating vapor mixture is brought into contact with the mixture prepared in step (a).

17 Claims, 2 Drawing Sheets

METHOD FOR PRODUCING SULFUR-CONTAINING POLYMERS

Figure 1:
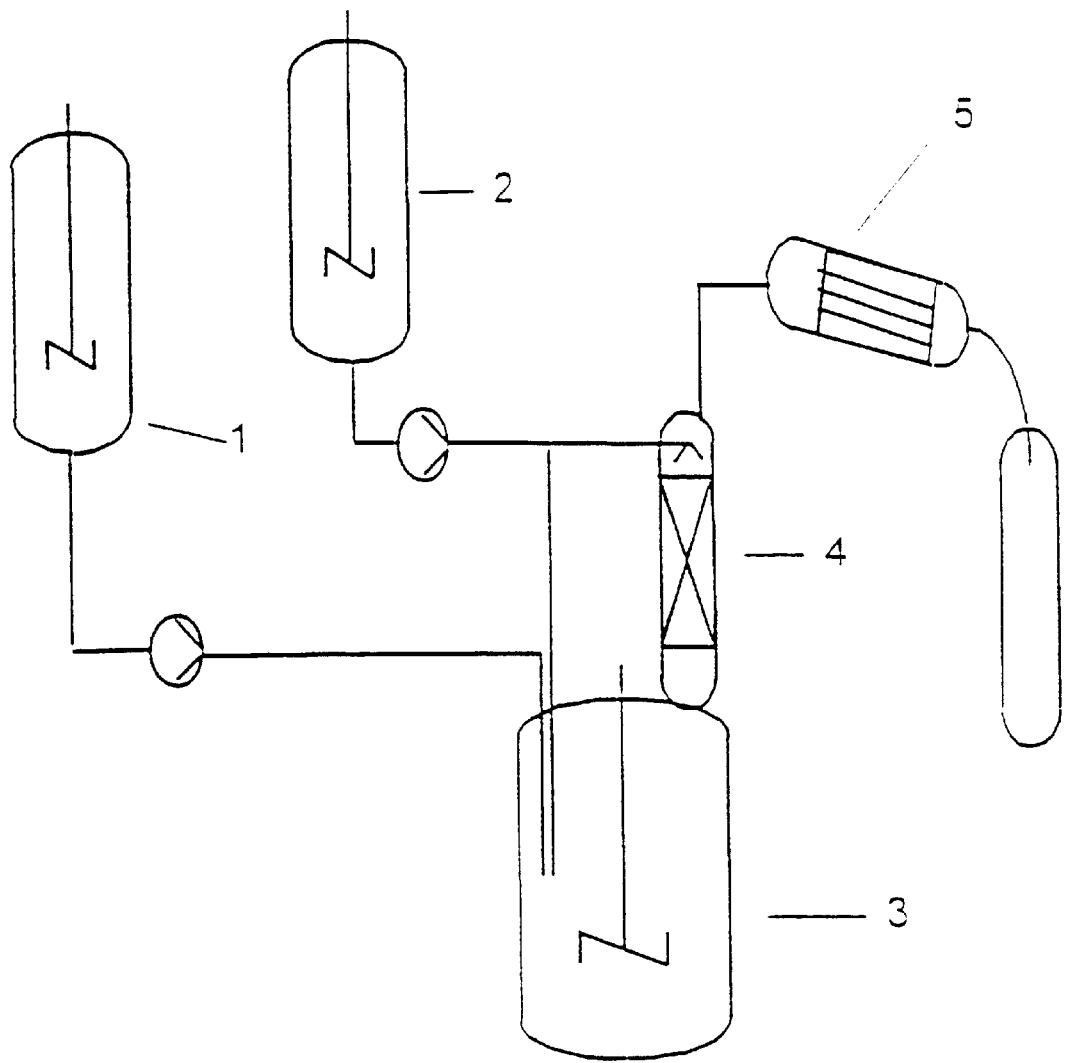
Figure 2:
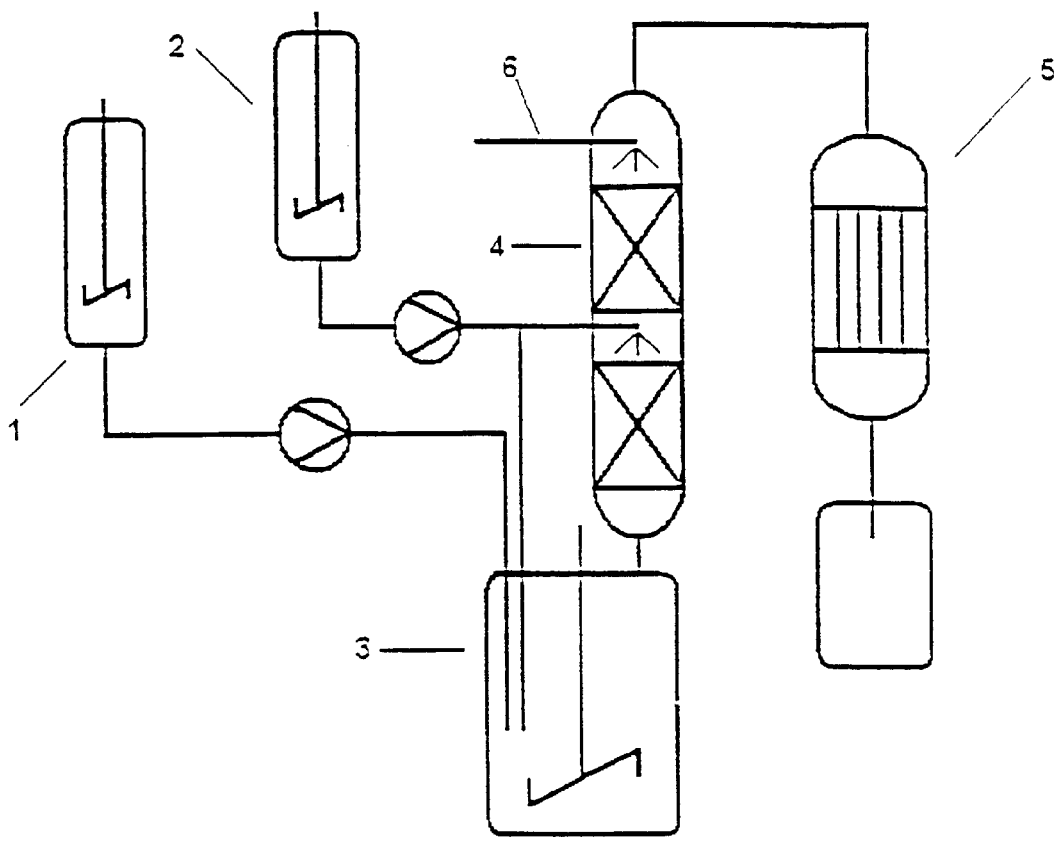

The invention relates to a process for preparing linear or branched sulfur-containing polymers, such as polyarylene sulfides, in particular polyphenylene sulfide (PPS).

The preparation of polyarylene sulfides and the properties of these polymers are known per se to the skilled worker. The monomers used comprise dihalogenated aromatic hydrocarbons, in particular dichloro-benzene (DCB) and sulfides, in particular sodium sulfide. The monomers are reacted in a high-boiling, polar aprotic solvent, such as N-methylpyrrolidone (NMP). The polymer is then isolated.

Typically, hydrous sulfide is firstly reacted with the polar aprotic solvent, and the mixture substantially dewatered by distillation, resulting in solvent losses and also losses of hydrogen sulfide.

These processes have serious space-time yield disadvantages, however. The dewatering is frequently protracted, since foaming has to be suppressed and it is desirable to minimize losses of the aprotic polar solvent. Overall, the known processes give cycle times of 10 hours or even longer, even using reaction temperatures up to 280° C. There is also a restriction on monomer concentration, since the charge of sulfide or sulfide hydrate at full concentration in the solvent at the start is easily precipitated during addition of the dihalogenated aromatic hydrocarbon.

There are also known processes in which hydrous sulfide is added to the reaction mixture and the water introduced with the sulfide is distilled off during the reaction. $Na_2S$ easily precipitates during this process and is removed from the reaction mixture.

EP-A-0 737 705 describes a two-stage process for preparing polyarylene sulfides. It uses an excess of the dihalogenated aromatic hydrocarbon in the first stage of the reaction, and the resultant prepolymer, which contains halogen end groups, is reacted with small amounts of sulfide in the second stage. This application satisfactorily achieves the object of short reaction times, but carries out the dewatering batchwise as in the prior art, which has the disadvantages described.

EP-A-0 374 462 describes a process for preparing polyarylene sulfides from dihalogenated aromatic hydrocarbons and from sulfides. The dihalogenated aromatic hydrocarbon, together with the polar solvent, forms an initial charge in the process. Sulfide is metered in, to some extent continuously, without prior dewatering. The sulfide source used comprises a mixture of 66.6 mol % of sodium sulfide and 33.4 mol % of sodium hydrogensulfide with 5 mol of hydrate water per sulfide equivalent. The amount of hydrogensulfide metered in is a stoichiometric excess of 20 mol %, based on the dihaloaromatic compound of the initial charge, resulting in emanation of $H_2S$ together with the hydrate water during the metering phase. Although the process disclosed avoids the disadvantages of batchwise dewatering of mixtures of solvent and sulfide, it gives solvent losses and considerable monomer losses. The space-time yield for the single-stage reaction is also unsatisfactory, with a cycle time of 12 hours.

EP-A-0 215 259 describes a process for preparing polyarylene sulfides from dihaloaromatic compounds and alkali metal sulfide in N-methyl-caprolatcam. One half of the reaction mixture forms an initial charge at gentle reflux. The second half of the mixture is then metered in. The sulfide used comprises a mixture of anhydrous sodium sulfide and anhydrous sodium hydrogensulfide. A dewatering precedes the actual polymerization reaction. The average reaction time in the stirred reactor cascade is 12.5 hours. Hydrogen sulfide emanates in this process, too, and has to be disposed of.

WO-A-97/47676 describes a process for preparing sulfur-containing polymers, in particular polyarylene sulfides, from a sulfide and from an aromatic dihalogen compound in a solvent, where a mixture made from aromatic dihalogen compound and sulfide is polymerized, aromatic dihalogen compound and sulfide are added to the polymerized mixture, and the reaction mixture is polymerized further. The process requires an additional polymerization step prior to the further addition of the monomers. This increases cycle times.

In the light of the prior art mentioned, the object on which the invention was based was to provide an improved process which prepares sulfur-containing polymers, in particular polyarylene sulfides, over a wide range of molar masses (e.g. $M_w$=from 10,000 to 200,000 g/mol), and which avoids the disadvantages of batchwise dewatering of mixtures made from polar solvent and sulfide and, respectively, overcomes the restriction on monomer concentration during the preparation of polyarylene sulfides.

Surprisingly, it has now been found that sulfur-containing polymers, in particular polyarylene sulfides, can be prepared at high space-time yield at reaction temperatures of not more than 250° C. and with short reaction times (less than 5 hours), and specifically without batchwise dewatering of a mixture made from sulfide and from polar solvent. According to the invention, the sulfide is fed continuously or to some extent continuously to the polymerization reactor, but not in the form of a salt melt or aqueous solution but rather in the form of its solution in the polar solvent.

The invention consequently provides a process for preparing sulfur-containing polymers from at least one sulfide and from at least one aromatic dihalogen compound in at least one solvent, where
 a) a mixture or solution made from the sulfide and from the solvent is prepared in a first reaction vessel,
 b) the solution or mixture prepared in step (a) is placed in a second reaction vessel with the aromatic dihalogen compound, and
 c) the sulfide and the aromatic dihalogen compound react in the second reaction vessel while addition proceeds, to form the sulfur-containing polymer.

It has also been found that the loss of hydrogen sulfide during the reaction can be substantially suppressed and the loss of solvent reduced if the mixture prepared in step (a) is brought into contact with the vapor mixture emanating from the second reaction vessel before the mixture is passed to the second reaction vessel.

The novel process represents a marked improvement in the cost-effectiveness and environmental compatibility of the preparation process for sulfur-containing polymers, in particular polyarylene sulfides, over a wide range of molar mass, from 10,000 to 200,000 g/mol. The loss of monomers and solvent from the reaction system during the reaction is avoided or minimized.

The invention also provides a process for preparing sulfur-containing polymers from at least one sulfide and from at least one aromatic dihalogen compound in at least one solvent, where
 a) a mixture made from a sulfide and from a solvent is prepared in a first reaction vessel,
 b) the sulfide and an aromatic dihalogen compound react in a second reaction vessel to form a sulfur-containing polymer,
 c) the pressure in the second reaction vessel is to some extent or completely released during the reaction, and the emanating vapor mixture is brought into contact with the mixture prepared in step (a).

The mixture prepared in step (a) may be metered simultaneously with the aromatic dihalogen compound and, if desired, with further solvent continuously or to some extent continuously into the second reaction vessel.

In one preferred embodiment of the invention a stoichiometric excess of from 3 to 100 mol %, preferably from 5 to 75 mol % and particularly preferably from 10 to 50 mol %, of the dihalogenated aromatic hydrocarbon, based on the stoichiometric amount of sulfide, is metered into the second reaction vessel. This gives a halogen-terminated prepolymer. This prepolymer is isolated and, in a second stage, reacted with a small amount of sulfide to give the high-molecular-weight polymer.

Another embodiment of the present invention is a process for preparing a sulfur-containing high-molecular-weight polymer from at least one halogen-terminated prepolymer prepared as in steps (a) to (c) and from a small amount of sulfide, where d) less than 10 mol % of sulfide, based on the amount of sulfide used in steps (a) to (c), are added to solvent and prepolymer, e) prepolymer and sulfide are polymerized to give the sulfur-containing polymer, and f) the sulfur-containing polymer is isolated.

Sulfur-containing polymers are polymers which contain arylene sulfide units. The arylene constituents contain mono- or polynuclear aromatic systems or compound aromatic systems. The aromatic systems may also contain heteroatoms. Examples of aromatic systems of this type, which may be substituted or unsubstituted, are benzene, pyridine, biphenyl, naphthalene and phenanthrene. Examples of substituents are $C_1$–$C_6$-alkyl, $C_1$–$C_6$-alkoxy, carboxyl, amino and sulfo. Examples of compound aromatic systems are biphenyl and aromatic systems linked by ether bridges, for example arylene ethers.

Preferred sulfur-containing polymers are polyarylene sulfides, in particular polyphenylene sulfide.

Suitable sulfides for preparing polymers are inorganic or organic sulfides. Inorganic sulfides are sulfides of the alkali metals or of the alkaline earth metals, for example lithium sulfide, potassium sulfide, calcium sulfide and preferably sodium sulfide. The inorganic sulfides may also be prepared in situ from corresponding hydrogensulfides or from hydrogen sulfide, for example by reaction with alkali metal hydroxides.

Suitable organic sulfides are salt-like sulfides with organic cations. For the purposes of the invention, organic sulfides include organic sulfur compounds which under the reaction conditions release sulfide anions or release hydrogensulfide anions, for example thioacetamide and thio-N-methylpyrrolidone.

The sulfides and, as appropriate, alkali metal hydroxides may be used in anhydrous form, with water of crystallization in the form of their crystalline salt hydrates, or in the form of their aqueous solutions, if desired controlled to a particular temperature.

Suitable aromatic dihalogen compounds are dihalogenated aromatic hydrocarbons, inter alia dihalobenzenes, such as o-, m- and p-dichloro-benzene, substituted dihalobenzenes, such as 2,5-dichlorotoluene, 3,5-dichlorobenzoic acid, 2,5-dichlorobenzenesulfonic acid, 3,5-dichlorobenzenesulfonic acid, and salts thereof. It is also possible to use dihalonaphthalenes, such as 1,4-dibromonaphthalene, or dihalodiphenyl ethers, such as 4,4'-dichlorodiphenyl ether. Mixtures of different dihalogenated compounds may also be used. Small amounts, from 0.2 to 5 mol %, based on dihaloaromatic compound, of polyhalogenated aromatic hydrocarbons may also be used, to obtain ranched or crosslinked sulfur-containing polymers.

Dihaloaromatic compounds and sulfide are also termed monomers.

Suitable solvents for preparing the polymer are dipolar aprotic solvents of amide type, such as dimethylformamide (DMF), dimethylacetamide (DMAc), N-methylcaprolactam or N-alkylated pyrrolidones, such as N-methylpyrrolidone (NMP), or mixtures of these. NMP is particularly preferred.

The term prepolymer includes oligomers or polymers which contain arylene sulfide units. These products usually have a molar mass, expressed as number-average molar mass Mn, of from 500 to 20,000 g/mol. They may be linear or branched. It is also possible to use substituted dihaloaryl compounds, such as 2,5-dichlorotoluene, to prepare substituted prepolymers. It is preferable to prepare prepolymers with halogen end groups (halogen-terminated prepolymers), in particular chlorine end groups.

The novel process is described below using the example of the preparation of polyphenylene sulfide (PPS) from sodium sulfide and p-dichlorobenzene, but is not restricted thereto.

Sodium sulfide, in the form of one of its hydrates, such as the trihydrate, is mixed with NMP. To prepare the solution from sulfide and from the organic solvent in a first reaction vessel, the molar ratio of sulfide to NMP is S/NMP=from 4 to 0.2, preferably S/NMP=from 2 to 0.5.

Sodium sulfide hydrate may also be prepared in situ from sodium hydrogensulfide and sodium hydroxide in the form of the concentrated aqueous solution or salt hydrate. To set a preferred pH range it is possible to use nonstoichiometric amounts of NaSH and NaOH, or to add one of these two components to the sodium sulfide. An excess of from 0.1 to 25 mol % of NaOH may be used for the contact of the vapor mixture emanating from the second reaction vessel with the mixture made from solvent and sulfide.

The initially two-phase mixture made from sulfide and NMP is heated under an inert gas in a first reaction vessel to about 85–220° C., preferably 130–210° C., forming a homogeneous solution in a weakly exothermic reaction. In the simplest case the reaction vessel is composed of stainless steel, and better corrosion resistance is given by nickel-based alloys or titanium. The preparation of the homogeneous solution from sulfide and from the solvent may proceed batchwise or else continuously.

In one preferred embodiment, the entire amount, or at least some part of the stream, of the solution made from NMP and sulfide from the first reaction vessel is first brought into contact with the vapor emanating from the second reaction vessel. Various scrubbers are suitable for this, and may also have the form of a column. It is appropriate to increase the vapor-liquid contact surface in the scrubber by incorporating suitable plates or packings. The materials suitable for the scrubber and its inserts are the same as those for the first reaction vessel. The high specific surface area of the inserts means that corrosion-resistant materials, such as titanium, have proven particularly successful. The solution made from NMP and sulfide is passed into the second reaction vessel from the bottom of the scrubber directly by gravity or, depending on the operating pressure of the scrubber and of the second reaction vessel, by means of a pump.

p-Dichlorobenzene (DCB), in the form of a melt or a solution in NMP, is charged to a heated or unheated feed vessel. For preparing chlorine-terminated prepolymers a stoichiometric excess of from 3 to 100 mol %, preferably from 5 to 75 mol % and particularly preferably from 10 to 50 mol %, of DCB is used, based on sulfide.

The reactants are then metered in the stated proportional quantities into the second reaction vessel, which is at reaction temperature. The reaction temperature is generally from 180 to 250° C., preferably from 215 to 240° C. If the conduct of the reaction is to some extent continuous it is appropriate for some of the NMP to form an initial charge at a controlled temperature in the second reaction vessel. If the conduct of the reaction is fully continuous, there is a constant amount of the reacting mixture in the second reaction vessel. Further NMP may be fed to the second reaction vessel from a feed vessel or in the form of the solutions of the two monomers. The molar ratio of NMP used to sulfide used is from 10 to 1, preferably from 4 to 1 and particularly preferably from 3.5 to 1. The term "NMP used" means the entire amount from the feed and initial charge in the second reaction vessel and the solvent for the monomers.

Under these conditions formation of the polyphenylene sulfide is simultaneous with addition of the monomers. During the reaction the hydrate water from the sulfide is continuously removed from the reactor as vapor. The pressure in the second reaction vessel is regulated via a pressure-retention valve. Depending on the water content of the sulfide used, the concentration of the monomers used, the reaction temperature and the boiling point of the polar solvent the operating pressure is from 1 to 20 bara (bar absolute), preferably from 2 to 10 bara and particularly preferably from 3 to 7 bara. Together with the water vapour, and depending on the pressure, the temperature and the basicity of the solution, some of the monomers emanate in the form of DCB vapor and hydrogen sulfide gas, together with some solvent.

In one preferred embodiment, the emanating vapor mixture is brought into contact in the scrubber with the solution to be fed to the second reaction vessel and made from NMP and sulfide. In one preferred embodiment of the invention this proceeds countercurrently, for example as the wash solution trickles under gravity through the rising vapor. There is in principle no restriction on the operating pressure of the scrubber. It is appropriately between the operating pressure of the second reaction vessel and atmospheric pressure.

In one preferred embodiment of the invention, the scrubber is operated at the operating pressure of the second reaction vessel. The location of the scrubber is directly upon the second reaction vessel, so that the solution, after passing through the scrubber, runs out directly into the second reaction vessel by gravity. The pressure of the scrubbed vapor mixture is released at the head of the scrubber via the pressure-retention valve, and the vapor mixture is then condensed.

In another preferred embodiment of the invention, the pressure of the vapor mixture from the second reaction vessel is released via a pressure-retention valve into the scrubber and this is operated at a pressure of from 0.8 to 1.5 bara. The solution made from NMP and sulfide, after passing through the scrubber, is drawn off from the bottom of the scrubber and actively pumped into the second reaction vessel. The scrubbed vapor mixture is condensed at the head of the scrubber at atmospheric pressure, if desired after passing through another pressure-retention valve, and discharged. The operating temperature of the liquid at the bottom of the scrubber is from 150 to 250° C. The operating temperature at the head of the scrubber is determined by the operating pressure and by the composition of the vapor mixture. It is from 90 to 220° C., preferably from 95 to 180° C.

In one preferred embodiment, the components emanating as vapor from the scrubber, other than water, are fed back to the process. After condensation of the emanating vapor, for example at from 50 to 80° C. at atmospheric pressure, the condensate separates under typical reaction conditions into a heavier DCB-rich phase and a lighter water-rich phase. There is some solvent in both phases. The DCB-rich phase can be pumped directly back into the reacting mixture or reused after purifying the DCB.

Any solvent present in the water-rich phase can be reclaimed, for example by distillation, and reused. It is also possible for the solvent to be separated off directly, without condensing the vapor mixture from the scrubber. For this, the vapor mixture from the scrubber may be fed to a distillation column, for example.

In one particularly preferred embodiment, the purposes of the scrubber and of a subsequent distillation column may also be achieved in a single apparatus, by operating the lower part of the column as a scrubber and the upper part of the same as a rectification column. For this, the sulfide-solvent mixture is applied approximately to the middle of the column and a liquid, preferably water, is applied to the head of the column. In the lower part of the column, hydrogen sulfide is absorbed and condensation of some part of the solvent vapor begins, with evaporation of some of the water present in the sulfide-solvent mixture. In the upper part of the column, the remaining solvent vapor is practically fully condensed, with some or full evaporation of the water applied to the head of the column. The vapor mixture leaving the column is composed practically only of dichlorobenzene and water vapor.

It is advantageous for a dilute alkali or a base to be applied to the head of the column instead of water, to absorb final residues of hydrogen sulfide. The concentration of the base is from 0.01 to 10 mol/l.

If the molar ratio of sulfide to NMP in the first reaction vessel is in the region S/NMP>1, reaction of the excess sulfide with $H_2S$ or NMP may take place in the column. Chemisorption thus removes $H_2S$ and NMP from the evaporation equilibrium, and monomer losses, and also solvent losses, are further minimized. The monomer losses may be further reduced if the mixture prepared from sulfide and solvent in the first reaction vessel is to some extent dewatered before it enters the scrubber or the second reaction vessel.

If the conduct of the reaction is to some extent continuous, the metering phase lasts from 15 to 240 minutes, preferably from 30 to 120 minutes. The reaction mixture is then stirred for 30 to 90 minutes at the reaction temperature. The cycle time for the first stage of the reaction is less than 5 hours, preferably less than 3 hours. The first stage of the reaction comprises the metering-in, which is to some extent continuous, and continued stirring time. For the work-up, it can be advantageous for some or all of any residual water of reaction to be removed after the reaction has finished. If desired, the reactor contents may be adjusted to neutrality or weak acidity by adding acids prior to work-up. Suitable acids are acetic acid, hydrochloric acid or carbon dioxide.

If the conduct of the reaction is fully continuous, the reaction mixture is discharged from the second reaction vessel during the reaction, so that the level of fill in the second reaction vessel remains constant over time. The residence time for this continuous stirred-tank reactor is from 10 to 180 minutes, preferably from 30 to 120 minutes.

The conversion, based on DCB, in the reaction producing the prepolymers is from 10 to 98 mol %, preferably from 30 to 95 mol %, particularly preferably from 50 to 90 mol %. The average molar mass of the prepolymers, expressed as weight average $M_w$, is from 1000 to 30,000 g/mol, preferably from 2000 to 20,000 g/mol and particularly preferably from 3000 to 15,000 g/mol.

The prepolymer is in solution in the reaction mixture alongside the substantially crystalline salt precipitate and is isolated by suitable methods. The prepolymer may be precipitated by cooling and filtered off together with the salt. It is appropriate for the filtration residue to be washed with solvent, to remove adhering residues of mother liquor. This separation gives polymer and salt as solid, and the mother liquor. The mother liquor may be used again directly for preparing further polymer. The prepolymer is obtained from the solid, which may also previously have been dried, by boiling with water, followed by filtration.

It is also possible for the resultant suspension to be worked up by flash evaporation or spray drying. The main constituents drawn off as vapor here are solvents and other low-molecular-weight substances. Polymer and salt are produced as a substantially dry solid. The solid prepolymer is obtained after water-washing and drying.

It is also possible for the salt to be separated off by pressure filtration at a temperature at which the prepolymer in the reaction mixture is present as a liquid or in solution. These temperatures are generally from 100 to 300° C., preferably from 180 to 280° C. However, instead of the pressure filtration it is also possible to use other processes for separating solids off from liquids, for example centrifuging or decanting. Here, the only residue is the salt, and the prepolymer has become dissolved again in the filtrate, from which the polymer can be isolated either by spray drying or by crystallizing followed by filtration. It is also possible for the prepolymer to be transferred directly to the following reaction steps (d) and (e).

The halogen-terminated prepolymer is further polymerized in step (e) after adding not more than 10 mol % of sulfide (d), based on the amount of sulfide used in steps (a) to (c). In one preferred embodiment of the invention, the ratio by weight of solvent to prepolymer used in step (e) is less than 5, preferably from 1 to 2.5.

The reaction conditions for the further polymerization in step (e) may be varied within wide limits. For example, the reaction temperature may be from 180 to 290° C., preferably from 230 to 270° C. In one particularly preferred embodiment of the invention, the reaction temperature is <250° C. The reaction times may be from 20 to 180 minutes, preferably from 30 to 120 minutes. For the continuation of the polymerization in step (e) additional measures may, if desired, be taken to achieve the highest possible molar masses. These include adding promoters. These promoters are the alkali metal and alkaline earth metal salts of lower carboxylic acids, in particular sodium acetate. It is also possible for specified amounts of water or of other nonsolvents for the polymer to be added in step (e) in order to carry out the further polymerization in a two-phase reaction system. Finally, further additives, such as acetic acid or hydrogen sulfide or carbon dioxide, may be added to adjust the basic strength of the system.

In one preferred embodiment of the invention, the polymer in step (e) is present homogeneously dissolved in the solvent. The reaction mixture is then a clear and viscous solution. It comprises, as undissolved solids, not more than 5% by weight of salt, preferably less than 2% by weight of salt, based on the total weight of the reaction mixture in step (e). Polymerization of the prepolymer and of the sulfide to give the sulfur-containing polymer in step (e) takes place in practically homogeneous solution.

In one preferred embodiment of the invention, the total reaction time is not more than 5 hours at a reaction temperature not above 250° C.

All of the phases of the polymer preparation may be conducted either batchwise or continuously. For example, the reaction may be conducted continuously by way of a stirred tank cascade, in a flow tube or in a combination of these two apparatuses.

The isolation of the polymer in step (f) takes place by crystallization or pressure filtration, for example. It is also possible to use other processes for isolating solids from liquids, for example centrifuging or decanting. It is also possible for the suspension produced to be worked up by flash evaporation or spray drying. The main constituents drawn off here as vapor are solvents and other low-molecular-weight substances. Polymer and salt by-product are produced as a substantially dry solid mixture. Prior to the work-up steps mentioned, the mixture may first be clarified at or near the reaction temperature, at which the polymer is present in homogeneous solution, to extract residual amounts of salt.

The melting points of the polyphenylene sulfides are from 270 to 305° C., usually from 280 to 295° C. The melt viscosity is from 5000 to 500,000 mPas (centiPoise), preferably from 50,000 to 250,000 mPas (centiPoise). The melt viscosity is stable without additives. It alters by less than 10% over a period of 1 hour at 300° C.

The sulfur-containing polymers prepared by the novel process, such as polyarylene sulfides, in particular polyphenylene sulfide, feature high purity and high quality. A particularly remarkable property of the polymers is that they have practically no odor and no discoloration. The polymers also have good performance on exposure to heat.

The present invention also provides sulfur-containing polymers, such as polyarylene sulfides, obtainable by the novel process.

The sulfur-containing polymers prepared according to the invention can be processed by melt extrusion to give moldings. Films and fibers with good mechanical properties may also be produced.

The novel process has many advantages:

The amount of solvent used is less than 350 g of solvent per mole of sulfide used, and a good space-time yield is therefore achieved.

The overall reaction time is less than 5 hours.

The reaction temperature is <250° C or even substantially lower, suppressing side reactions which can give toxic contamination of the polymer.

The polymer is obtained at a yield of at least 90%, usually 95%, based on the amount of sulfide used in the overall reaction.

The losses of hydrogen sulfide during addition of the monomers with simultaneous evaporation of the water of hydration are substantially depressed. Technical measures for exhaust air purification and reclaiming the hydrogen sulfide outside of the actual reaction apparatus are simplified and reduced.

The losses of solvent during addition of the monomers with simultaneous evaporation of the water of hydration are minimized. This reduces the technical costs for solvent reclamation outside of the actual reaction apparatus.

The invention is explained in more detail using a drawing and examples.

DRAWING

Drawings 1 and 2 show the structure of a plant as in preferred embodiments of the novel process.

Drawing 1 shows a plant which comprises a feed vessel (1), a first reaction vessel (2), a second reaction vessel (3), a scrubber (4) and a condenser (5).

Drawing 2 shows a plant which comprises a feed vessel (1), a first reaction vessel (2), a second reaction vessel (3), a scrubber combined with distillation column (4), a condenser (5) and a water feed (6).

EXAMPLES

Example 1

35 kg of sodium sulfide (61%, 273 mol) and 2.25 kg of sodium hydrogen-sulfide (28 mol) and 35 kg of NMP were inertized with nitrogen in a 100 I stainless steel stirred tank and heated, with stirring. A homogeneous solution of the sulfide in NMP was formed at from 150 to 170° C. 48 kg of DCB (327 mol) and 16 kg of NMP were placed in a heated feed vessel. 45 kg of NMP were placed in a 200 I titanium stirred tank reactor and heated to 210° C., with stirring. At this temperature the pumping of the DCB/NMP solution and of the solution of the sulfide in NMP into the reactor was begun.

In this process the reactor is heated further and achieves a reaction temperature of 230° C. The pressure in the reactor was held constant at 6 bara by means of a pressure-retention valve. The emanating vapor mixture was condensed. It separated into a DCB-rich lower phase and a water-rich upper phase. The heavy phase was pumped back into the titanium reactor. The metering-in of the monomers was completed after 1.5 hours. The molar ratio of NMP to sulfide used in the second reaction vessel was 3.22. Stirring then continued for an hour at 230 to 235° C. The reaction mixture was then cooled, the prepolymer precipitated and the reactor emptied at 80° C. into a nutsch filter. The product was filtered off from the mother liquor, which comprised NMP as main constituent alongside excess DCB. This was followed by washing with water until salt-free, and drying. The proportion by weight of organically bonded chlorine in the prepolymer was 1.5%. The yield of prepolymer was 30.0 kg (93% of theory).

Example 2

25 kg of the prepolymer from Example 1 were heated to 250° C. with 500 g of sodium sulfide trihydrate and 300 g of water in 60 kg of NMP. A clear solution formed at 235° C. The reaction temperature was held at 250° C. for 90 minutes. The solution was then diluted with 25 kg of NMP and cooled to about 80° C., and the precipitated polymer filtered off. The polymer was washed three times with 50 liters of water at 85° C. and then dried. The yield was 24.5 kg (98% of theory). The melt viscosity of the polymer was 52 Pas, measured at 310° C. and 1000 s$^{-1}$. It altered by less than 10% over a period of one hour.

Example 3

40 kg of sodium sulfide (from 60 to 62%, 307.7 mol) and 2.4 kg of sodium hydrogensulfide 70% (30 mol) and 40 kg of NMP formed an initial charge in a 100 I stainless steel stirred tank, were inertized with nitrogen and heated, with stirring. A homogeneous solution of the sulfide in NMP formed at from 150 to 170° C. 60 kg of DCB (408 mol) and 10 kg of NMP were placed in a heated feed vessel. 50 kg of NMP were placed in a 200I titanium stirred tank reactor and heated to 210° C., with stirring. At this temperature the pumping of the DCB/NMP solution at 40 kg/h into the reactor was begun. The solution made from sulfide and NMP was pumped from the first stainless steel reaction vessel to the head of a titanium column.

During this process the reactor was further heated and held at a reactor temperature of 234° C. The pressure in the reactor was held constant at 5.5 bara by means of a pressure-retention valve. The emanating vapor mixture was condensed. It separated into a DCB-rich lower phase and a water-rich upper phase. The heavy phase was pumped back into the titanium reactor. The molar ratio of NMP to the sulfide used was 2.7. Stirring was then continued for 1.5 hours at from 230 to 235° C. The reaction mixture was then cooled, and the prepolymer precipitated, and the reactor emptied at 80° C. into a nutsch filter. The product was filtered off from the mother liquor, which comprised NMP as main constituent alongside the excess of DCB. It was then washed with water until salt-free, and dried. The proportion by weight of organically bonded chlorine in the prepolymer was 1.5%. The yield of prepolymer was 33.4 kg (92% of theory).

Example 4

38.5 kg of sodium sulfide (61%, 301 mol) and 25 kg of NMP (253 mol) formed an initial charge in a 100 I stainless steel stirred tank. The mixture was inertized with nitrogen and heated, with stirring. The molar ratio of sulfide to NMP in the first reaction vessel was 1.19 (S/NMP). A homogeneous solution of the sulfide in NMP formed at from 150 to 170° C. 48 kg of DCB (327 mol) and 16 kg of NMP were placed in a heated feed vessel. 55 kg of NMP were placed in a 200 I titanium stirred tank reactor and heated to 210° C., with stirring. At this temperature, pumping of the DCB/NMP solution directly into the reactor began, via a pipe dipped into the material. The solution made from sulfide and NMP was pumped from the first stainless steel reaction vessel to the head of a titanium column. The titanium column had been provided with a packing made from profiled titanium sheet. The base of the column was open and had been flanged directly onto the head section of the titanium reactor. The pressure in the reactor and in the scrubber column was held constant at 4 bara by way of a pressure-retention valve. During the process the reactor was heated further and the reactor temperature finally held constant at 234° C. The emanating vapor mixture was condensed. It separated into a DCB-rich lower phase and a water-rich upper phase. The heavy phase was pumped back into the titanium reactor. The light upper phase of the condensed vapor mixture was weighed and analyzed after the experiment. It comprised 12.2 kg of water and 6.2 kg of NMP.

After 1.5 hours the metering-in of the monomers had ended. The molar ratio of NMP to sulfide used in the second reaction vessel was 3.22. Stirring then continued for an hour at 234° C. The reaction mixture was then cooled, and the prepolymer precipitated, and the reactor emptied at 80° C. into a suction funnel. The product was filtered off from the mother liquor, which comprised NMP as main constituent alongside the excess of DCB. It was then washed with water until salt-free, and dried. The proportion by weight of organically bonded chlorine in the prepolymer was 1.4%. The yield of prepolymer was 31.5 kg (97% of theory).

A precisely weighed amount of the NMP-containing mother-liquor filtrate was diluted with a specified amount of water and its hydroxide ion concentration determined by titration. The scheme

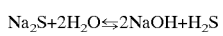

$$Na_2S + 2H_2O \rightleftharpoons 2NaOH + H_2S$$

linked the hydroxide ion concentration of the mother-liquor filtrate with the amount of gaseous hydrogen sulfide which emanated during the reaction, via the equilibrium for hydrolysis of the sodium sulfide. The result of evaluating the titration was that 2.8 mol of H$_2$S had emanated, corresponding to 0.9% of the combined amount used of sulfide and hydrogensulfide.

The results from Examples 1 and 4 are shown in the table.

TABLE

| PARAMETER | EXAMPLE 1 | EXAMPLE 4 |
|---|---|---|
| Stirred tank (2) | | |
| Sodium sulfide | 35 kg (61%, 301 mol) | 38.5 kg (61%, 301 mol) |
| Sodium hydrogen-sulfide | 2.25 kg (70%, 28 mol) | — |
| NMP | 25 kg (253 mol) | 25 kg (253 mol) |
| S/NMP | 1.19 | 1.19 |
| Feed vessel (1) | | |
| DCB | 48 kg (327 mol) | 48 kg (327 mol) |
| NMP | 16 kg | 16 kg |
| Titanium stirred tank (3) | | |
| NMP | 55 kg | 55 klg |
| Introduction into the reactor | | |
| DCB/NMP solution | via a pipe dipped into the material | via a pipe dipped into the material |
| Sulfide and NMP solution | via a pipe dipped into the material | via a titanium column |
| Pressure | 4 bara | 4 bara |
| S/NMP | 3.22 | 3.22 |
| Reaction temperature | 234° C. | 234° C. |
| Upper phase | | |
| $H_2O$ | 12.1 kg | 12.2 kg |
| NMP | 12.8 kg | 6.2 kg |
| Prepolymer | | |
| Bonded chlorine | 1.5% | 1.4% |
| Yield | 30.0 kg (92% of theory) | 31.5 kg (97% of theory) |
| $H_2S$ losses | 6.9 mol % | 0.9 mol % |

What is claimed is:

1. A process for preparing sulfur-containing polymers from at least one sulfide and from at least one aromatic dihalogen compound in at least one solvent, wherein
   a) a solution made from a sulfide and from a dipolar aprotic solvent is prepared in a first reaction vessel,
   b) the sulfide and an aromatic dihalogen compound react in a second reaction vessel to form a sulfur-containing polymer,
   c) the pressure in the second reaction vessel is to some extent or completely released during the reaction, and the emanating vapor mixture is brought into contact with the solution prepared in step a.

2. The process as claimed in claim 1, wherein the aromatic dihalogen compound is used in a stoichiometric excess of from 3 to 100 mol % of the dihalogenated aromatic hydrocarbon, based on the stoichiometric amount of sulfide.

3. The process as claimed in claim 1, wherein dihalogenated aromatic hydrocarbons emanating during the reaction are reintroduced to the polymerization.

4. The process as claimed in claim 1, wherein the solution made from the sulfide and from the dipolar aprotic solvent is prepared at a temperature of from 85 to 220° C.

5. The process as claimed in claim 1, wherein the molar ratio of sulfide to solvent in the solution made from the sulfide and from the dipolar aprotic solvent is sulfide/NMP is from 4 to 0.2.

6. The process as claimed in claim 1, wherein prior to entry into the second reaction vessel in step (c) the solution prepared in step (a) is brought into contact in a scrubber using gravity with the rising vapor mixture.

7. The process as claimed in claim 6, wherein a column is used as said scrubber.

8. The process as claimed in claim 6, wherein the lower part of a column is used as said scrubber and in the upper part of the column solvent is separated from water.

9. The process as claimed in claim 1, wherein the molar ratio of solvent to sulfide used in step (b) is from 4 to 1 or the weight ratio of solvent to sulfide used in step (b) is from 4 to 1.

10. A process for preparing a sulfur-containing polymer from at least one halogenated prepolymer and sulfide which is prepared as claimed in claim 1 in a first stage, in which process a stoichiometric excess from 3 to 100 mol % of an aromatic halogen compound is used, based on sulfide, and
   d) in a second stage less than 10 mol % of sulfide, based on the amount of sulfide used in steps (a) to (c), are added to solvent and prepolymer,
   e) prepolymer and sulfide are polymerized in the second stage to give the sulfur-containing polymer, and
   f) the sulfur-containing polymer is isolated.

11. The process as claimed in claim 10, wherein the reaction of prepolymer and sulfide to give the sulfur-containing polymer in step (e) proceeds in virtually homogeneous solution which comprises not more than 5% by weight of salt, based on the total weight of the reaction mixture in step (e).

12. The process as claimed in claim 3, wherein the aromatic dihalogen compound is used in a stoichiometric excess of from 5 to 75 mol % of the dihalogenated aromatic hydrocarbon, based on the stoichiometric amount of sulfide.

13. The process as claimed in claim 3, wherein the aromatic dihalogen compound is used in a stoichiometric excess of from 10 to 50 mol % of the dihalogenated aromatic hydrocarbon, based on the stoichiometric amount of sulfide.

14. The process as claimed in claim 13, wherein the solution made from the sulfide and from the dipolar aprotic solvent is prepared at a temperature of from 130 to 210° C.

15. The process as claimed in claim 14, wherein the molar ratio of sulfide to solvent in the solution made from the sulfide and from the dipolar aprotic solvent is sulfide/NMP is from 2 to 0.5.

16. The process as claimed in claim 8, wherein the molar ratio of solvent to sulfide used in step (b) is from 3.5 to 1 or the weight ratio of solvent to sulfide used in step (b) is from 3.5 to 1.

17. The process as claimed in claim 11, wherein the reaction of prepolymer and sulfide to give the sulfur-containing polymer in step (e) proceeds in virtually homogeneous solution which comprises less than 2% by weight of undissolved solids based on the total weight of the reaction mixture in step (e).

* * * * *